CONTROLLABLE DIGITAL STORAGE DISPLAY CIRCUITRY

Filed Aug. 6, 1964 2 Sheets-Sheet 1

INVENTORS
EVAN T. COLTON
ZAKI ABDUN-NABI
BERNARD M. GORDON
BY Robert J. Schiller
ATTORNEY Dec. 13, 1966 E. T. COLTON ETAL 3,292,036

CONTROLLABLE DIGITAL STORAGE DISPLAY CIRCUITRY

Filed Aug. 6, 1964

2 Sheets-Sheet 2

INVENTORS
EVAN T. COLTON
ZAKI ABDUN-NABI
BY BERNARD M. GORDON

Robert J. Schiller
ATTORNEY

United States Patent Office 3,292,036
Patented Dec. 13, 1966

3,292,036
CONTROLLABLE DIGITAL STORAGE DISPLAY CIRCUITRY

Evan T. Colton, Lynnfield, Zaki Abdun-Nabi, Framingham, and Bernard M. Gordon, Magnolia, Mass., assignors, by mesne assignments, to Transitron Electronic Corporation, a corporation of Delaware Filed Aug. 6, 1964, Ser. No. 387,963
12 Claims. (Cl. 315—84.6)

This invention relates to digital electronic devices and more particularly to selective digital storage display circuits.

It is often desirable to display the state of the output of a digital counter on command, and to retain or store the display until it is desired to observe a selected later output state.

A principal object of the present invention is therefore to provide a novel storage display circuit for converting a digital code and displaying the converted code on command, i.e. selectively.

Other objects of the present invention are to provide such a circuit whereby the converted code can be displayed or stored indefinitely in a read-out device; to provide such a circuit wherein the input code can be changed or withdrawn during storage of a converted code without deterioration or change in the storage function; to provide such a circuit wherein only a single input pulse is required to accomplish erasure or removal of the displayed code, decoding of the then existing state of the input code, and display of the newly converted or decoded code.

Another important object of the present invention is to provide a circuit of the type described in which the read-out device is controlled by gated current conductive means.

Further objects of the present invention are to provide such a circuit which is simple and inexpensive to build; to provide such a circuit which is particularly adapted for use with a gaseous discharge tube as a display element; to provide such a circuit wherein the response to an input pulse is such that the leading edge of the latter causes the operating potential of a display device to fall to an inoperative level so as to eliminate the displayed code, and the trailing edge of the pulse restores said potential to an operative level and permits a converted input code to be displayed; and to provide such a circuit adapted to accept the input code as gating signals which are operative to affect the display of a storage device only after a command pulse has been received.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

Figure 1:
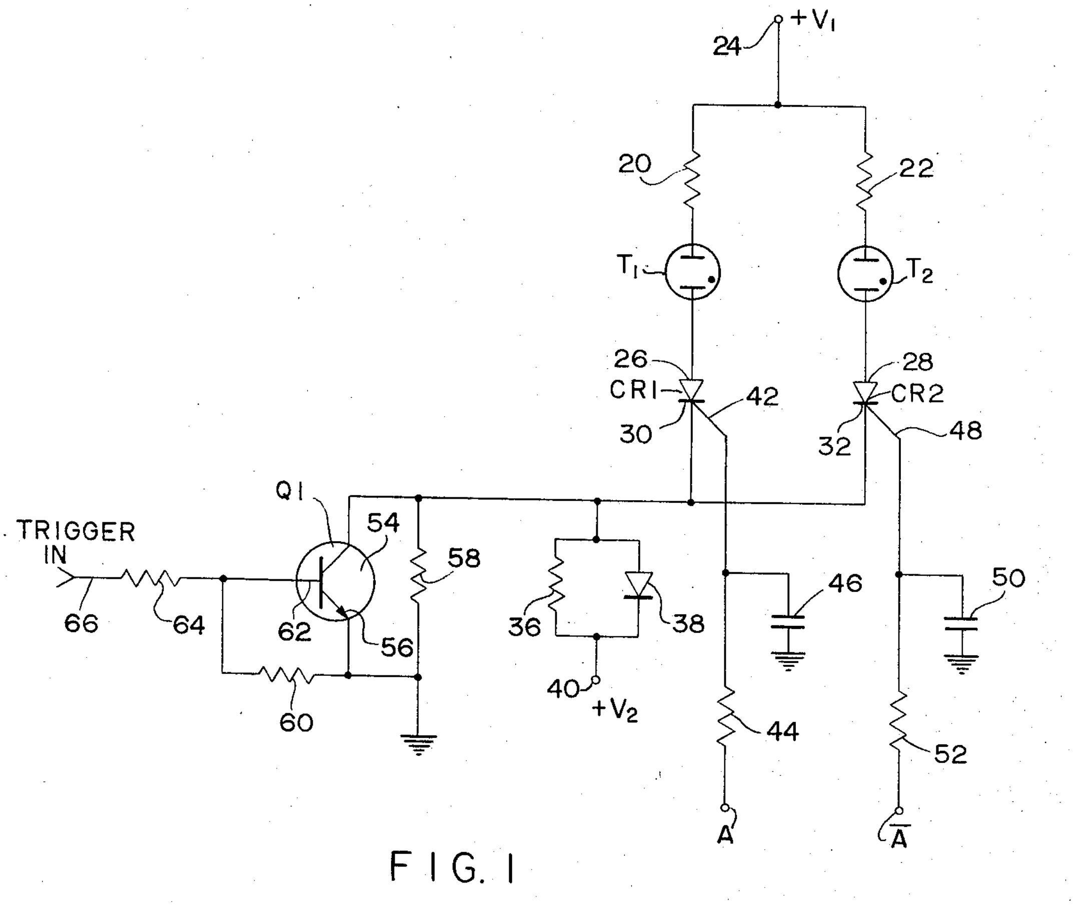
Figure 2:
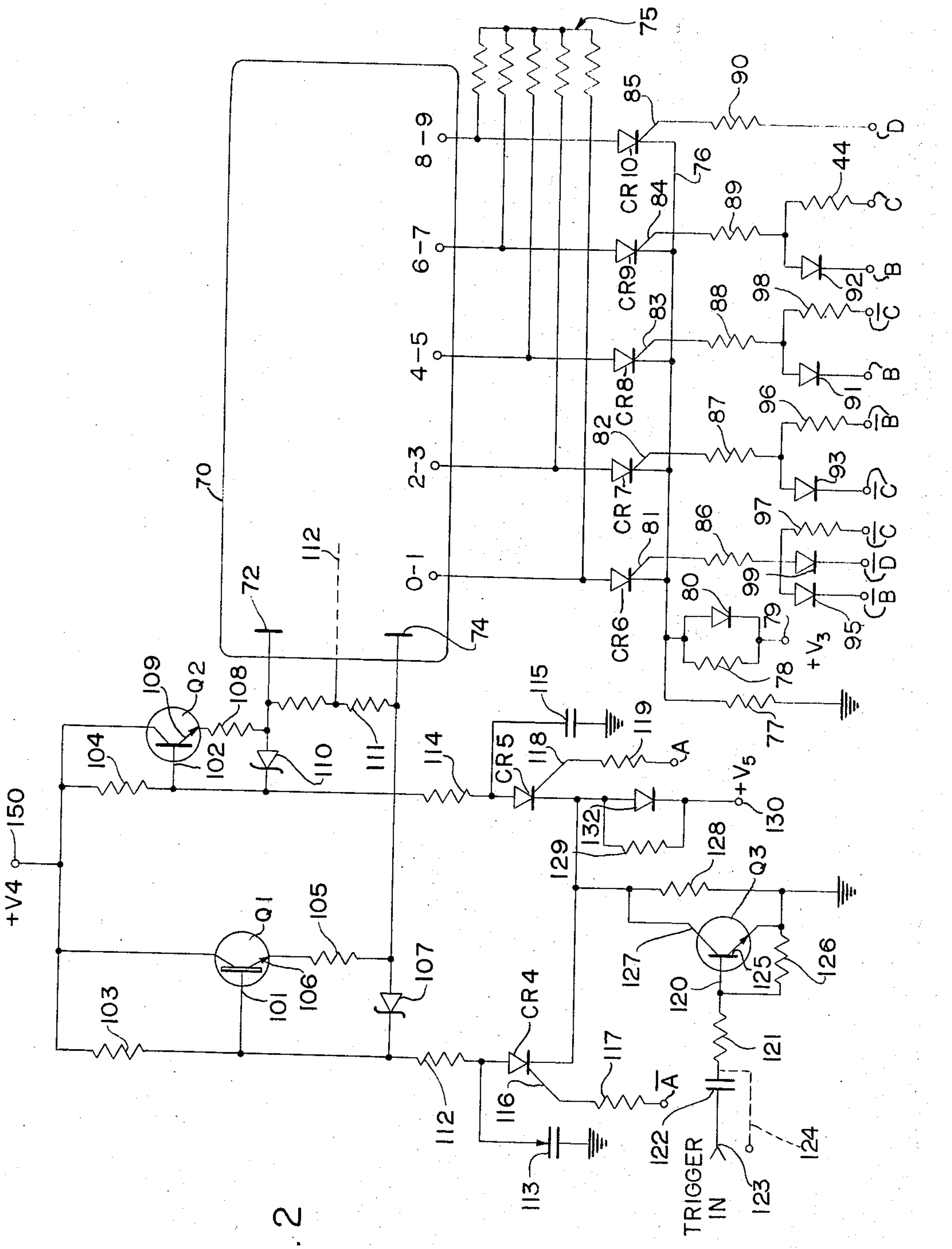

For a fuller understanding of the nature and objects of the present invention, reference should be had to the following detailed description taken in connection with the accompanying drawings wherein:

FIG. 1 is a schematic circuit diagram of an exemplary simple digital storage display circuit embodying the principles of the present invention; and FIG. 2 is another circuit embodying the principles of the present invention and particularly adapted for decimal display and conversion of binary coded decimal signals.

Referring now to FIG. 1, there will be seen a simple digital display intended to provide a binary indication and comprising a pair of read-out or display elements, such as glow discharge (e.g. neon type) tubes T1 and T2. Each of tubes T1 and T2 has a first terminal coupled through a respective one of current limiting resistors 20 and 22 to terminal 24 adapted to be connected to a source of energizing voltage +V1. The respective other or second terminals of T1 and T2 are connected directly to respective anodes 26 and 28 of controlled rectifier devices CR1 and CR2, the latter constituting means for controlling activation of the neon tubes.

Generally, a controlled rectifier has an anode, cathode and gate lead and is characterized in that when reverse-biased, it blocks anode-cathode conduction in substantially the same manner as an ordinary rectifier, but when forward-biased within limits, also blocks conduction until a comparatively small trigger signal is applied to the gate lead. The controlled rectifier will then conduct in the forward direction much as an ordinary rectifier, and cessation of the gate signal will not substantially affect forward conduction. The latter ceases when the current flow is interrupted and will not be renewed upon reapplication of a forward bias until a trigger signal once again reactivates the gate. Examples of such controlled rectifier are, of course the well-known solid-state silicon controlled rectifier as is described in Controlled Rectifier Manual, first edition, General Electric Company, Auburn, New York, 1960, and in some configurations of the present invention, the well-known thyratron tube.

Cathodes 30 and 32 respectively of controlled rectifiers CR1 and CR2 are connected to one another and thence through the parallel combination of resistor 36 and diode 38 to terminal 40, the latter being adapted to have coupled thereat a source of potential +V2. Diode 38 is poled such that it is connected with its anode to the cathodes of controlled rectifiers CR1 and CR2.

Gate lead 42 of controlled rectifier CR1 is connected to a current signal source comprising resistor 44 connected to terminal A, and is also connected through capacitor 46 to ground. Similarly, gate lead 48 of controlled rectifier is connected to ground through capacitor 50 and also to a current signal source comprising resistor 52 connected to terminal $\bar{A}$. Both terminals A and $\bar{A}$ are adapted to have impressed thereon signal voltages representative, for example, of a binary code.

The cathodes of the controlled rectifiers are also connected to collector 54 of switching transistor Q1. Emitter 56 of the latter is connected to ground, to collector 54 through resistor 58, and through resistor 60 to base 62 of transistor Q1. Base 62 is coupled, as through resistor 64, to trigger input terminal 66.

The operation of the embodiment of FIG. 1 can advantageously be described using the same exemplary values. For example, it can be assumed that T1 and T2 are neon tubes which ionize at around 90 volts and cut off at below about 50 volts; that V1 is then about +160 volts and V2 is about +15 volts; that signal voltages both A and $\bar{A}$ are two-level, substantially exclusive signals at either +6 or +12 volts, the latter being considered the "on" or energized state such that when either one of A or $\bar{A}$ is in the "on" state, the other is then "off" or at +6 volts; and that the trigger signal to be applied at terminal 66 is a single pulse having sharp rise and fall times and magnitude greater than that necessary to force and maintain transistor Q1 in saturation. For purposes of description, it can further be assumed that initially terminal 66 is unenergized, terminal A is "on" and controlled rectifier CR1 is in conduction. Thus, the condition of the display is that tube T1 is lit and tube T2 is unlit. This can be considered to represent a past state of, for example, the output of a simple flip-flop whose output terminals could be coupled to terminals A and $\bar{A}$.

If it is now desired to erase the display, and read out whatever the state of the flip-flop has become, the requisite trigger pulse, which can be supplied manually from a push-button for example or automatically as by a timer, is applied at terminal 66. As the leading edge of the pulse goes positive, it drives transistor Q1 rapidly into conduction and to saturation. As the transistor conducts, its collector potential goes toward ground, and this pulls cathodes 30 and 32 of controlled rectifiers CR1 and CR2 down so as to forward-bias both controlled rectifiers. Rectifier CR1 is originally in conduction by definition; the gate-to-cathode impedance is low; and as its cathode potential goes toward ground it, also pulls the gate voltage toward ground, thus discharging capacitor 46. Rectifier CR2 is originally non-conducting. However, as cathode 48 also is pulled toward ground potential, rectifier CR2 becomes forward biased such that the current provided from resistor 52, despite the low potential level of the signal at terminal $\overline{A}$, is sufficient to fire CR2 into conduction. When this occurs, the potential at gate-lead 48 immediately goes toward ground, and capacitor 50 discharges. Thus, during most of the duration of the trigger pulse at terminal 66, both controlled rectifiers are conducting, and both neon tubes T1 and T2 are lit.

The decay transient of the trigger pulse drops transistor Q1 rapidly into non-conduction. The voltage on collector 54 of transistor Q1 rises quickly to a level determined by the voltage divider action of resistors 58 and 36. For example, if resistors 58 and 36 are respectively about 6.8 KΩ and 4.3 KΩ, collector 54 will rise to a fixed level of about 9 volts. While cathodes 30 and 32 of the controlled rectifiers follow the rise in potential on collector 54, gate leads 42 and 48 will be held for a time at or near ground because capacitors 46 and 50, being in discharged condition, are at or near ground. The capacitors therefore serve as means for heavily reverse-biasing the gate leads with respect to the cathodes and thus stop current conduction in both controlled rectifiers. Anodes 26 and 28 of the controlled rectifiers immediately rise toward the potential of +V1 and consequently both tubes N1 and N2 go out. The potential of both gate leads now rises, gate lead 42 going to the potential of terminal A and gate lead 48 moving to the voltage level of terminal $\overline{A}$, the rate of change in gate lead potential being determined by the RC constant in the respective gate lead circuit. It is desirable but not necessary that the RC constants of the gate leads be matched.

Assuming that the hypothetical flip-flop output at this time is such that terminal $\overline{A}$ is "on" and terminal A is therefore "off", since the voltage level at terminal A is below the voltage level at collector 54, it is unable to gate rectifier CR1 into conduction. However, the presence of the defined +12 volt signal of terminal $\overline{A}$ causes rectifier CR2 to conduct and thus, tube T2 turns on, displaying the state of the flip-flop. When the controlled rectifier fires, diode 38 provides means for bypassing current dumped into the divider of resistors 58 and 36 and thus clamps the collector voltage of transistor Q1 to +V2. Resistor 36 and the voltage source at terminal 40 will be seen to operate as a sink for a small current during display of the flip-flop output. It is apparent that it is highly desirable that the voltage of collector 54, set by resistors 58 and 36 and +V2 when transistor Q1 is non-conductive, be sufficiently below the energization voltage or "on" level of terminals A and $\overline{A}$ so as to allow the "on" level to trigger or gate a controlled rectifier, and sufficiently above the "off" level of terminals A and $\overline{A}$ to insure that the requisite controlled rectifier remains back-biased. Because the current then flowing through the conductive controlled rectifier raises the cathode potential on both controlled rectifiers above the enabled voltage level of either gate lead, the display therefore will ignore any subsequent changes between the normal voltage levels expected at terminals A and $\overline{A}$ due to changes in the state of the flip-flops coupled thereto until and unless a trigger signal is again applied at terminal 66.

Capacitors 46 and 50 have been shown coupled between respective gate leads and ground. It will be understood, however, that such capacitors can be connected (as for example, as shown in FIG. 2) respectively between the anodes of the controlled rectifiers and ground and thus serve as means for heavily reverse biasing the rectifier anodes with respect to their cathodes following "turn-off" of transistor Q1. Indeed, if the controlled rectifiers are thyratron tubes, the anode of each should be thus coupled through a capacitor to ground. The display elements in the embodiment thus described need not be neon glow tubes, the principles of the present invention being applicable to other types of known display elements of electrical mechanical and electromechanical nature.

Referring now to FIG. 2 there will be seen application of the principles of the present invention to provide a decoding and storage circuit of somewhat more complexity than that shown in FIG. 1. The embodiment of FIG. 2 is particularly adapted for converting a binary coded decimal type of output and providing a decimal display thereof. As a read-out device or means for providing such display there is shown schematically biquinary numerical indicator tube 70, such as the cold-cathode gas-filled tube sold under the trade designation of ZM1030 Bi-Qui by Amperex Electronic Corporation of Hicksville, New York. It will be appreciated that the principles of the present invention are applicable to other means for displaying other codes and in other forms such as alphanumeric. Tube 70 comprises five pairs of tied cathodes, each pair being identified by the decimal numeral display associated therewith, and a pair of anodes 72 and 74.

As means for converting a code (such as the output of a binary-coded decimal counter having four, cascaded, bistable stages operating in an 8–4–2–1 counting mode) and for driving tube 70 in accordance with the conversion, there is shown a circuit comprising a number of controlled rectifiers identified as CR–4, CR–5, CR–6, CR–7, CR–8, CR–9 and CR–10. These are divided into two groups the first group being rectifiers CR–4 and CR–5 which constitute part of means for selecting the odd or even state of tube 70. The remainder of the controlled rectifiers constitute part of means for selecting one of the five cathode pairs of tube 70 in accordance, for example, with the output of the aforesaid decimal counter.

The anodes of rectifiers CR–6, CR–7, CR–8, CR–9 and CR–10 are respectively connected directly to cathode pairs 0–1, 2–3, 4–5, 6–7, and 8–9. Resistive network 75 is provided for coupling all of the cathode pairs of tube 70 to one another through high resistances (i.e. about 200 KΩ), so as to eliminate extraneous glow in the tube. All cathodes of the controlled rectifiers are tied to common line 76 and the latter in turn is connected through resistors 77 and 78 (which constitute a voltage divider) respectively to ground and to terminal 79. The latter is adapted to have a voltage +V3 applied thereto so as to maintain a voltage range on the controlled rectifier cathodes. Diode 80 is connected across resistor 78 and poled to operate as means for clamping the cathode common line at about +V3.

Gate leads 81, 82, 83, 84, and 85 respectively of controlled rectifiers CR–6, CR–7, CR–8, CR–9, and CR–10, are each connected to a corresponding current source respectively comprising resistors 86, 87, 88, 89, and 90 activated by the decoded output, for example, of the exemplary binary-coded decimal counter.

It can be assumed that, as well known in the art, the counter is the type which has eight output terminals (two for each stage) each of which can be energized at either a low level (e.g. +6 volts) to indicate a disabled terminal or a high level (e.g. +12 volts) to indicate an enabled terminal. If A and $\overline{A}$ are the terminals of the "one" stage, B and $\overline{B}$, C and $\overline{C}$, and D and $\overline{D}$ being the respectively terminal pairs of the "two," "fours" and "eights" stages, then it can be shown that decoding thereof can be effected, i.e. the counts thereof can be uniquely identified, when the various terminals are enabled in combinations as in the following table:

| Count | Enabled Terminals | | | |
|---|---|---|---|---|
| 0 | A | $\overline{B}$ | $\overline{C}$ | $\overline{D}$ |
| 1 | $\overline{A}$ | $\overline{B}$ | $\overline{C}$ | $\overline{D}$ |
| 2 | A | $\overline{B}$ | C | |
| 3 | $\overline{A}$ | $\overline{B}$ | C | |
| 4 | A | B | $\overline{C}$ | |
| 5 | $\overline{A}$ | B | $\overline{C}$ | |
| 6 | A | B | C | |
| 7 | $\overline{A}$ | B | C | |
| 8 | A | D | --------- | |
| 9 | $\overline{A}$ | D | --------- | |

Thus the circuit of FIG. 2 includes terminals identified as B connected to controlled rectifiers CR–8 and CR–9 respectively through diodes 91 and 92 respectively in series with resistors 88 and 89; terminals identified as C and connected to controlled rectifiers CR–7 and CR–9 respectively as through diode 93 and resistor 94 respectively in series with resistors 87 and 89; a terminal identified as D and coupled to controlled rectifier CR–10 through resistor 90; terminal identified as $\overline{B}$ connected to controlled rectifier CR–6 as through series diode 95 and resistor 96 and to controlled rectifier CR–7 through series resistors 96 and 87; terminals identified as $\overline{C}$ and connected to controlled rectifiers CR–6 through series resistors 97 and 86 and to controlled rectifier CR–8 through series resistors 98 and 88; and a terminal identified as $\overline{D}$ and connected as through diode 99 in series with resistor 86 to controlled rectifier CR–6. All of these diodes and resistors in the gate lead circuits (including resistors connected to terminals A and $\overline{A}$) constitute a resistive decoding matrix. It will thus be seen that diodes 95, 99, and resistor 97 arranged to accept a parallel code and jointly supply a voltage to resistor 86, together with the latter constitute a current source for selectively triggering controlled rectifier CR–6 responsively to the counter output decoded according to the table noted hereinbefore. Similarly, diode 93 and resistor 96 arranged to accept a parallel code are each in series with resistor 88 so as to constitute a triggering current source for controlled rectifier CR–7; the triggering current source for controlled rectifier CR–8 similarly comprises resistor 98 and diode 91 each in series with resistor 88; resistor 89 is likewise in series with each of diode 92 and resistor 44 to form the triggering current source for controlled rectifier CR–9; and, of course, resistor 90 comprises the current source for the gate lead of controlled rectifier CR–10.

Means are included for providing a substantially constant magnitude current flow to the biquinary tube and comprises first and second transistors Q1 and Q2. The collectors of the transistors are tied to one another and to terminal 100 which is intended to be connected to a source of D.C. supply voltage +V4 (e.g. about 200 volts) for tube 70. Base 101 of transistor Q1 and base 102 of transistor Q2 are respectively connected through resistors 103 and 104 to the tied collectors. Anode 74 of tube 70 is connected through resistor 105 to emitter 106 of transistor Q1 and is also connected to the anode of Zener diode 107. Anode 72 is similarly connected through resistor 108 to emitter 109 of transistor Q2 and to the anode of Zener diode 110. The cathodes of Zener diodes 107 and 110 are respectively connected to the bases of transistors Q1 and Q2. Tube screen 112, which is disposed between the odd and even numbered cathodes of tube 70, is maintained at a potential determined by a tapped high-resistance voltage divider coupled between anodes 72 and 74.

Base 101 is also connected through resistor 112 to one side of capacitor 113 and to the anode of controlled rectifier CR–4. Base 102 is likewise connected through resistor 114 to one side of capacitor 115 and to the anode of controlled rectifier CR–5. The other sides of capacitors 113 and 115 are grounded. The cathodes of the controlled rectifiers are connected to one another. Gate lead 11 of controlled rectifier CR–4 is connected to a trigger current source such as resistor 117 which is series connected to terminal $\overline{A}$, the latter being adapted to have a voltage output thereon as from output $\overline{A}$ of the exemplary counter. Similarly, gate lead 118 of controlled rectifier CR–5 is connected through resistor 119 to terminal A.

It will be remembered that controlled rectifiers CR–4 and CR–5 are used to select the odd or even state of tube 70 as shown in the foregoing table. As means for selectively biasing controlled rectifiers CR–4 and CR–5 there is provided transistor Q3, base 120 of which is connected through series resistor 121 and capacitor 122 to trigger input terminal 123. If the input signal at terminal 123 is intended to be a D.C. pulse, coupling capacitor 122 is not necessary and may be bypassed as shown in broken lines at 124. Emitter 125 of transistor Q3 is connected both to ground and through resistor 126 to base 120. Collector 127 of transistor Q3 is connected directly to the cathodes of controlled rectifiers CR–4 and CR–5 and also to the junction of resistors 128 and 129 which are in series respectively between ground and terminal 130. The latter is adapted to have a biasing voltage +V5 (e.g. about 15 volts) applied thereto. Diode 132 is connected across resistor 129 for clamping the voltage level of collector 127 at about +V5.

In describing the operation of the embodiment of FIG. 2, it may be assumed that the appropriate values of voltages V3, V4, and V5 are present at the proper terminals and that the decimal number 3, for example, is on display by tube 70. Thus, controlled rectifiers CR–7 and CR–4 are in conduction, and all the other controlled rectifiers are non-conductive; such situation subsists regardless of the presence of or change amongst either "enabling" or "disabling" voltage signals at the respective gate leads.

It may also be assumed that the aforementioned counter has a code established by the enablement or disablement of its output terminals and such code, present at the instant of interest at the appropriate ones of the input terminals A, $\overline{A}$, B, $\overline{B}$, C, $\overline{C}$, D, and $\overline{D}$ is convertible to decimal numeral 6 according to the preceding table. A number of exemplary values for certain circuit elements can be assumed as follows:

| | |
|---|---|
| Resistors **103**, **104**, **112**, and **114** | 33K |
| Resistors **105** and **108** | 1.2K |
| Resistor **129** | 4.3K |
| Resistors **128** and **77** | 6.8K |
| Resistor **78** | 5.1K |
| Capacitors **113** and **115** | 0.005 $\mu$fd. |

A single, preferably rectangular input pulse is now applied at trigger terminal 123. As the pulse voltage rises toward its plateau level, transistor Q3 begins to conduct and is rapidly driven into saturation. The voltage at collector 127 then goes toward ground from the level (e.g. about 16 volts) originally determined by the conduction of controlled rectifier CR–4, the voltage-divider action of resistors 128 and 129 with respect to the voltage +V5 to ground, and the clamping action of diode 132. This forward-biases both controlled rectifiers CR–4 and CR–5 and they both now conduct, dropping the voltages of each of anodes 72 and 74 to a level (e.g. 100 volts) below the extinguishing voltage of biquinary gas discharge tube 70. Any charge on capacitors 113 and 115 is considerably changed, and in the example described is reduced to about zero.

Inasmuch as tube 70 becomes extinguished and no current flows therein, controlled rectifier CR–7 is rendered non-conductive. Thus, common cathode line 76 drops in potential from a voltage of about +16 to that (e.g. about +10 volts) provided by the action of resistors 77 and 78 between +V3 and ground. As long as the input pulse persists at a level which keeps transistor Q3 in saturation, tube 70 will remain off, and changes in the state of the input signal levels to the gate leads of the controlled rectifiers will have no effect on tube 70.

However, as the input pulse at terminal 123 falls rapidly to its original state after a predetermined duration (for example, from 50 to 500 $\mu$sec.) transistor Q3 will become nonconductive, and its collector rises to the level set by resistors 128 and 129 across +V5 to ground, i.e., about 9 volts. Capacitors 113 and 115 tend respectively to hold the anodes of controlled rectifiers CR–4 and CR–5 at ground potential, and thus a reverse-bias appears and arrests conduction through controlled rectifiers CR–4 and CR–5. However, the anode of controlled rectifier CR–4 will begin to rise toward the level of +V3 or about +200 volts with a time constant determined by resistors 103 and 112 in series with capacitor 113. The same considerations apply to the anode of controlled rectifier CR–5. It will be remembered, for the display of decimal numeral 6, that the decoded output of the counter has enabled only gate leads 84 and 118 which are therefore at +12 volts, and the other gate leads are disabled, being for example at +6 volts. Thus, as the anode voltages of controlled rectifiers CR–4 and CR–5 rise above +12 volts, only the latter will be triggered into conduction. Controlled rectifier CR–4 will not be in a state to fire due to the bias at terminal $\overline{A}$ being below +9 volts. Thus, the voltage level at anode 74 rises to the firing point of the gas discharge tube (e.g. about 140 volts) and can excite the even-numbered cathodes of tube 70.

Of the controlled rectifiers in the cathode circuits of tube 70, only CR–9 is in a state in which it may fire because common cathode line 76 is at +10 volts, and gate lead 84 is thus more positive than its corresponding cathode; the other gate leads are all below the voltage of line 76 and will not fire their respective controlled rectifiers. As the voltage at anode 74 rises above the firing point of tube 70, controlled rectifier CR–9 is fired or triggered into conduction, current flows in tube 70 between anode 74 and cathode 6, displaying the desired decimal numeral. Zener diode 107 and resistor 105 largely determine the current flowing in tube 70 (as does diode 110 and resistor 108 for display of odd-numbered numerals).

Since certain changes may be made in the above apparatus without departing from the scope of the invention herein involved it is intended that all matter contained in the above description or shown in the accompanying drawings shall be interpreted in an illustrative and not in a limiting sense.

What is claimed is:

1. A storage display control circuit for converting a digital code and for activating a display of said converted code on command, said circuit comprising:

a source of command pulses, a source of a digital code signal subject to change independently of the occurrence of said command pulses, means responsive to the leading edge of each command pulse for erasing any previously stored code indication from a device providing said display;

means responsive to said digital code signal for providing a decoded signal representative of the value of said digital code signal;

means responsive to the trailing edge of said command pulse for providing said decoded signal to said device to display a representation of the value at that time of said digital code signal, and means associated with said device for storing the latter value until the occurrence of the next command pulse.

2. A storage display control circuit for energizing and deenergizing a storage display device upon command, said circuit comprising:

a source of command pulses, a source of a digital code signal subject to change independently of the occurrence of said command pulses, a first gated current conductive means for controlling current for activating a first display portion of said device;

second gated current conductive means for controlling current for activating a second display portion of said device;

said first and second gated current conductive means being responsive to said digital code signal during time intervals coincident with a command pulse for providing a decoded signal representative of the value of said digital code signal at those times, switch means responsive to the leading edge of a command pulse for providing a first signal to all said current conductive means so as to deactivate said display portions, said switch means being responsive to the trailing edge of said pulse for providing a second signal for enabling all said current conductive means so that the display portion associated with any one of said current conductive means is controlled upon application of a gating signal to said one current conductive means to display a representation of the value at that time of said digital code signal, and means associated with said device for storing the latter value until the occurrence of the next command pulse.

3. A circuit as defined in claim 2 wherein said first signal is provided by said switch means for substantially the duration of said pulse, and all said current conductive means are so responsive to said first signal as to keep said display portions deactivated for substantially said duration.

4. A circuit as defined in claim 2 including means for providing said gating signal to only one of said current conductive means selectively in accordance with a predetermined code.

5. A storage display control circuit for energizing and deenergizing a storage display device upon command, said circuit comprising:

a first controlled rectifier having an anode, cathode and gate lead, said anode and cathode being connectable for controlling current conduction to activate and deactivate a first display portion of said device;

a second controlled rectifier having an anode, cathode and gate lead, said anode and cathode being connectable for controlling current conduction to activate and deactivate a second display portion of said device;

means for providing a normal forward-bias on said rectifiers;

means for providing gating signals for energizing selectively according to a predetermined code only one of said gate leads at a first level sufficient to trigger the associated normally forward-bias rectifier into its conductive state and for energizing the other of said gate leads at a second level insufficient to trigger its associated normally forward-bias rectifiers into its conductive state;

switch means responsive to the leading edge of a command pulse for imposing on both said rectifiers sufficient additional forward-bias so as to permit both said rectifiers to be triggered into their conductive state by both said levels;

said switch means being responsive to said pulse for substantially the duration thereof for maintaining said additional forward-bias for substantially said duration;

said switch means being responsive to the trailing edge of said pulse for removing said additional forward-bias;

charge storage means connected to each of said rectifiers and operative upon removal of said additional forward-bias for initially reverse biasing each of said rectifiers until said charge storage means become so charged as to restore said normal forward-bias, thereby permitting only the rectifier associated with the gate lead energized at said first level to be in a conductive state.

6. A storage display control circuit for energizing and deenergizing a storage display device upon command, said circuit comprising:

a first controlled rectifier having an anode, cathode and gate lead, a second controlled rectifier having an anode, cathode and gate lead;

the cathodes of said rectifiers being connected directly to one another;

means for providing gating signals of a first level on only one of said gate leads and a second level on the other of said gate leads; both of said levels being above a system ground;

means for normally forward-biasing the anode-cathode circuit of each of said rectifiers such that only said first level is sufficient to trigger into conduction the one rectifier to the gate lead of which said first level is provided;

first switch means responsive to the leading edge of an input pulse for connecting said rectifier cathodes to said ground to add an increment to the forward-bias on said rectifiers such that said second level is sufficient to trigger the other rectifier into conduction;

second switch means connected to a first display portion of said device and responsive to conduction through said first rectifier for deenergizing said first display portion;

third switch means connected to a second display portion of said device and responsive to conduction through said second rectifier for deenergizing said second display portion;

said first switch means being responsive to the trailing edge of said pulse for disconnecting said cathodes from said ground; and charge storage means connected to each of said rectifiers and operative upon removal of said additional forward-bias for initially reverse biasing each of said rectifiers until said charge storage means become so charged as to restore said normal forward-bias thereby permitting only the rectifier associated with the gate lead energized at said first level to be in a conductive state.

7. A storage display circuit as defined in claim 6 wherein said charge storage means is a pair of capacitances, each of which is connected between said ground and the anode of a respective one of said rectifiers.

8. A storage display control circuit as defined in claim 6 wherein said charge storage means is a pair of capacitances each of which is connected between said ground and the gate lead of a respective one of said rectifiers.

9. A storage display control circuit as defined in claim 6 wherein said means for normally forward-biasing said rectifiers comprises voltage divider means having an intermediate tap connected to said cathodes and said first switch means is a transistor connected so as to form a conductive circuit between said cathodes and ground responsively to said leading edge.

10. A storage display control circuit for energizing and deenergizing on command a two-anode gaseous discharge tube having a plurality of cathodes, said circuit comprising, first and second controlled rectifiers connectable to said anodes for controlling the application of ionizing voltage thereto;

decoding means connectable to the cathodes of said tube for allowing conduction in said tube through only one of said tube cathodes selected according to the code applied and decoded by said decoding means;

said decoding means being adapted to provide gating signals of a first level to the gate lead of only one of said rectifiers, and of a second level to the gate lead of the other of said rectifiers, means for normally forward-biasing the anode-cathode circuit of each of said rectifiers such that only said first level is sufficient to trigger into conduction the one rectifier to the gate lead of which said first level is provided;

first switch means responsive to the leading edge of an input pulse for connecting said rectifier cathodes to said ground to add an increment to the forward-bias on said rectifiers such that said second level is sufficient to trigger the other rectifier into conduction;

said switch means being responsive to the trailing edge of said pulse for disconnecting said rectifier cathodes from ground, charge storage means connected between each of said rectifiers and ground, and operative upon disconnection of said rectifier cathodes for reversely-biasing said rectifiers until charged to a predetermined level at which said rectifiers become so forward-biased that the rectifier having said first level applied to its gate lead is triggered into conduction so as to permit only one of said tube anodes to rise to a voltage above its ionizing level and initiate current flow between said one tube anode and said one tube cathode.

11. A storage display control circuit for energizing and deenergizing on command a two-anode gaseous discharge tube having a plurality of cathodes, said circuit comprising, means for applying a voltage above the ionizing voltage of said tube to only a selected one of said tube anodes; and decoding means connectable to the cathodes of said tube for allowing conduction in said tube through only one of said tube cathodes selected according to the code applied and decoded by said decoding means;

said decoding means comprising a like plurality of controlled rectifiers each having an anode connected to a corresponding tube cathode, all of said controlled rectifiers having their cathodes connected in common;

means adapted to apply a positive bias voltage to said rectifier cathodes;

a like plurality of capacitances each connected between ground and like ones of the anode and the gate lead of a respective rectifier; and resistive matrix associated with said decoding means adapted to decode a digital coded signal so as to provide a respective gating signal to each gate lead of said rectifiers, only one of said gating signals being at a level sufficient to trigger the rectifier at the gate lead of which it is present in the event an anode of said tube is energized above said ionizing voltage.

12. Apparatus for displaying a representation of the value that a digital signal assumed at a predetermined time cordesponding to the occurrence of a command signal comprising, a source of said command signals,
a source of said digital signal subject to change independently of the occurrence of said command signals,
display means for displaying and storing said representation of the value,
decoding means for providing a decoded signal representative of the value of said digital signal,
means responsive to each command signal for erasing the representation of the value then displayed and stored by said display means,
and means responsive to each command signal and said decoded signal for conditioning said display means to display and store the value of said digital signal at the time of the last command signal until the occurrence of the next command signal.

References Cited by the Examiner

UNITED STATES PATENTS

| | | | |
|---|---|---|---|
| 2,646,534 | 7/1953 | Manley | 315—84.5 |
| 2,814,762 | 11/1957 | Jackson et al. | 315—84.5 |
| 2,896,119 | 7/1959 | Milan-Kamski | 315—84.6 |
| 3,021,450 | 2/1962 | Jiu | 315—84.5 |
| 3,080,501 | 3/1963 | Charbonnier | 315—84.5 |
| 3,158,781 | 11/1964 | Howell | 315—84.5 |

ARTHUR GAUSS, *Primary Examiner.*

S. D. MILLER, *Assistant Examiner.*